United States Patent Office 3,714,351
Patented Jan. 30, 1973

3,714,351
CERTAIN 3 - HYDROXY-TRIAZENES AND
THEIR USE IN CONTROLLING INSECTS
AND ARACHNIDS
Kurt Gubler, Riehen, near Basel, Switzerland, assignor to Ciba-Geigy Corporation, Ardsley, N.Y.
No Drawing. Filed Jan. 26, 1970, Ser. No. 5,953
Claims priority, application Sweden, Nov. 14, 1969, 1,169/69
Int. Cl. A01n 9/20
U.S. Cl. 424—226      12 Claims

ABSTRACT OF THE DISCLOSURE 3-hydroxy-triazenes, which possess growth inhibiting properties and which may be used for controlling insects, arachnids and developmental stages thereof are disclosed.

---

The present invention concerns new compositions and methods for controlling insects, arachnids and developmental stages thereof, using substituted 3-hydroxy-triazenes as active substances.

Insecticides and acaricidally active substances having commercial importance belong either to the class of phosphorus compounds, of carbamic acid esters, or of halogenated hydrocarbons. On the one hand these compounds are usually toxic to plants and/or warm-blooded animals, on the other hand, the pests become resistant to them. For this reason it is necessary to develop new agents containing active ingredients which are less toxic and to which insects and arachnids are not resistant.

From the group of triazene compounds, a large number are known as herbicidally active substances (British Pat. No. 1,130,469) and as active substances for the protection of organic materials of all kinds against attack by devouring insects (British Pat. No. 941,489). These are 1-phenyl-3,3-dialkyl-triazenes which, however, have no insecticidal or acaricidal properties.

It has now been found that compositions containing 1-phenyl-3-hydroxy-triazenes as active substances are excellently suited for the control of insects, arachnids and developmental stages thereof. These active substances are non-toxic for plants and warm-blooded animals in the usual application concentrations. The inhibiting action of these active substances on the developmental stages of insects and arachnids should be especially emphasized.

The compositions according to the invention comprise as active substance a triazene of the Formula I:

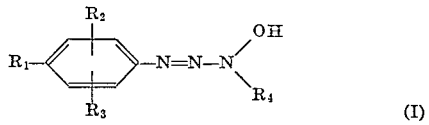

(I)

wherein

R₁ represents hydrogen, halogen, nitro, a lower alkyl radical, a lower alkyl or alkinyl radical linked to the nucleus through an oxygen or sulfur atom, a halogenalkyl radical, an alkanoyloxy or alkanoylamino radical, a halogenated or unsubstituted phenyl radical, R₂ and R₃ independently each represent hydrogen, halogen, a lower alkyl or halogenalkyl radical, a lower alkyl radical linked to the nucleus through an oxygen or sulfur atom, and R₄ represents an alkyl radical having from 1 to 8 carbon atoms, an alkenyl radical having 3 or 4 carbon atoms, a halogenalkyl radical, the phenyl radical, a halogenated phenyl radical, the benzyl radical or a halogenated alkyl radical.

Lower alkyl radicals represented by R₁ and R₃, which optionally may be linked to the nucleus through an oxygen or sulfur atom, are straight-chain or branched alkyl radicals having from 1 to 4 carbon atoms, in particular the methyl and ethyl radical. The alkanoyl moiety of an alkanoyloxy or alkanoylamino radical R₁ has from 2 to 5, in particular 2 carbon atoms. Halogenalkyl radicals R₁ and R₄ are alkyl radicals having from 1 to 4, preferably 1 or 2 carbon atoms which are mono- or polysubstituted by fluorine or chlorine. Lower alkinyl radicals R₁ which are linked to the nucleus through an oxygen or sulfur atom, have 3 or 4, preferably 3 carbon atoms.

Some of the 3-hydroxy-triazenes falling under Formula I are known from publications as complexing agents [Journal Indian Chem. Soc. 43 (1966), 289–290; ibid. 38 (1961), 771–775; ibid. 36 (1959), 563–566]. The new compounds are obtained by known processes (loc. cit.) by reacting a R₄-substituted hydroxylamine with an aryl diazonium compound. Another method for their production consists of reacting an arylhydrazine with a nitroso compound (M. Elkins et L. Hunter, J. Chem. Soc. 1938, 1346ff).

The active substances of Formula I contained in the compositions according to the invention are effective as stomach and contact poisons, having a long-lasting effect; in addition they are excellently suited for the control of sucking insects, for example for the control of the following biting and sucking insects; insects of the families Muscidae, Stomoxidae and Culicidae, e.g. polyvalent resistant and normally sensitive house flies (*Musca domestica*), stable flies (*Stomoxys calcitrans*) and mosquitoes (e.g. *Aedes aegypti, Culex fatigans, Anopheles stephensi*); of the families Curculionidae, Bruchididae, Dermestidae, Tenebrionidae, Chrysomelidae, Tineidae, e.g. granary weevils (*Sitophilus granarius*), bean beatles (*Bruchidius obtectus*), larder beetles (*Dermestes vulpinus*), yellow meal worms (*Tenebrio molitor*), Colorado potato beetles (*Leptinotarsa decemlineata*), clothes moths (*Tineola biselliella*), of the families Pyralidae, e.g. Mediterranean flour moths, Blattidae, e.g. cockroaches (*Phyllodromia germanica*), *Periplaneta americana* (*Blatta orientalis*), of the family Lucustidae, e.g. migratory locusts (*Locusta migratoria*), of the families Noctuidae and Hyponomeutidae, e.g. *Prodenia litura*, oak leaf rollers (*Tortrix viridana*), ermine moths (*Hyponomeuta matlinella*), etc.

In addition the new compositions can be used for the control of larval and adult stages of arachnids, e.g. of the families Tetranychidae, Arachnidae, Ixodidae, Argasidae, as well as for the killing of insect and arachnid eggs.

Of special importance for the control of insects, arachnids and developmental stages thereof are compositions containing one or more of the following active substances:

| No. | Compound | M.P.,°C. |
|---|---|---|
| 1 | 1-phenyl-3-hydroxy-3-methyl-triazene | 64–66 |
| 2 | 1-(4'-chlorophenyl)-3-hydroxy-3-methyl-triazene | 145–147 |
| 3 | 1-(4'-chlorophenyl)-3-hydroxy-3-ethyl-triazene | 109–110 |
| 4 | 1-(4'-chlorophenyl)-3-hydroxy-3-isopropyl-triazene | 133–134 |
| 5 | 1-(4'-chlorophenyl)-3-hydroxy-3-n-propyl-triazene | 95–96 |
| 6 | 1-(4'-chlorophenyl)-3-hydroxy-3-n-butyl-triazene | 71–73 |
| 7 | 1-(4'-chlorophenyl)-3-hydroxy-3-n-amyl-triazene | Oil |
| 8 | 1-(4'-chlorophenyl)-3-hydroxy-3-n-octyl-triazene | Oil |
| 9 | 1-(4'-chlorophenyl)-3-hydroxy-3-allyl-triazene | Oil |
| 10 | 1-(4'-bromophenyl)-3-hydroxy-3-methyl-triazene | 147–150 |
| 11 | 1-(4'-bromophenyl)-3-hydroxy-3-ethyl-triazene | 112–113 |
| 12 | 1-(4'-bromophenyl)-3-hydroxy-3-isopropyl-triazene | 136–138 |
| 13 | 1-(3'-bromophenyl)-3-hydroxy-3-methyl-triazene | 77–80 |
| 14 | 1-(3'-bromophenyl)-3-hydroxy-3-ethyl-triazene | 68–71 |
| 15 | 1-(4'-chlorophenyl)-3-hydroxy-3-chloroethyl-triazene | Oil |
| 16 | 1-(4'-chlorophenyl)-3-hydroxy-3-phenyl-triazene | 145–146 |
| 17 | 1-(4'-chlorophenyl)-3-hydroxy-3-benzyl-triazene | 149–151 |
| 18 | 1-(4'-methylphenyl)-3-hydroxy-3-methyl-triazene | 113–115 |
| 19 | 1-(4'-methylphenyl)-3-hydroxy-3-ethyl-triazene | 80–82 |
| 20 | 1-(4'-methylphenyl)-3-hydroxy-3-n-propyl-triazene | 54–55 |
| 21 | 1-(2',4'-dichlorophenyl)-3-hydroxy-3-methyl-triazene | 90–100 |
| 22 | 1-(3',4'-dichlorophenyl)-3-hydroxy-3-methyl-triazene | 153–159 |
| 23 | 1-(3',4'-dichlorophenyl)-3-hydroxy-3-ethyl-triazene | 97–94 |
| 24 | 1-(2'-methyl-4'-chlorophenyl)-3-hydroxy-3-ethyl-triazene | Oil |

| No. | Compound | M.P., °C. |
|---|---|---|
| 25 | 1-(2'-methyl-4'-chlorophenyl)-3-hydroxy-3-isopropyl-triazene. | 50-54 |
| 26 | 1-(2'-methyl-5'-chlorophenyl)-3-hydroxy-3-methyl-triazene. | 82-84 |
| 27 | 1-(2'-methyl-5'-chlorophenyl)-3-hydroxy-3-isopropyl-triazene. | Oil |
| 28 | 1-(4'-chloromethyl-phenyl)-3-hydroxy-3-ethyl-triazene. | Oil |
| 29 | 1-(3'-trifluoromethylphenyl)-3-hydroxy-3-methyl-triazene. | 90-92 |
| 30 | 1-(3'-trifluoromethylphenyl)-3-hydroxy-3-ethyl-triazene. | 35-36 |
| 31 | 1-(4'-methoxyphenyl)-3-hydroxy-3-methyl-triazene. | 99-102 |
| 32 | 1-(2'-methylthiophenyl)-3-hydroxy-3-ethyl-triazene. | Oil |
| 33 | 1-(4'-acetoxyphenyl)-3-hydroxy-3-ethyl-triazene. | Oil |
| 34 | 1-(4'-propargyloxyphenyl)-3-hydroxy-3-methyl-triazene. | 112-113 |
| 35 | 1-(4'-propargyloxyphenyl)-3-hydroxy-3-isopropyl-triazene. | 113-115 |
| 36 | 1-(4'-acetamino-phenyl)-3-hydroxy-3-methyl-triazene. | 200-205 |
| 37 | 1-(4'-acetamino-phenyl)-3-hydroxy-3-ethyl-triazene. | 185-188 |
| 38 | 1-(4'-acetamino-phenyl)-3-hydroxy-3-isopropyl-triazene. | 178-180 |
| 39 | 1,3-diphenyl-3-hydroxy-triazene. | Oil |
| 40 | 1-(4'-diphenylyl)-3-hydroxy-3-ethyl-triazene. | 149-151 |
| 41 | 1-(2',4'-dichlorophenyl)-3-hydroxy-3-isopropyl-triazene. | 50-52 |

The amount of active substance contained in the compositions according to the invention varies from 0.01 to 80% by weight, depending on whether they are ready-for-use preparations or so-called concentrates of the active substance. In addition, these compositions may contain other insecticides, for example from the group of phosphoric acid esters, phosphoric acid-semi esters or -semi amides, in particular the phosphoric acid esters of hetero- well as from the group of chlorinated hydrocarbons, furthermore acaricides, for example from the series of benzilic acid esters, phosphoric acid esters, sulfonic acid derivatives, etc. In addition, lures and baits can be incorporated therein. Furthermore, the new compositions may also contain active substances having bactericidal, fungicidal or nematocidal properties, thus broadening the biological effectiveness of the agents according to the invention.

The application concentrations of the active substances of the Formula I are in the range of 0.01 and 1% by cyclic compounds, from the group of carbamic acid esters, in particular of the heterocyclic carbamic acid esters, as weight, preferably from 0.01 to 0.5% by weight. The amount used is largely determined by the object to be treated, for example in fields, garden and fruit plantations the amounts are from 0.5 to 3 kg. of active substance per hectare, for the treatment of the soil from 2 to 10 kg. of active substance per hectare.

As can be seen from the tests described below, the development stages both of insects and of arachnids are inhibited by the use of the new agents. The larval development of emerged animals may be either inhibited or interrupted or, alternatively, adults are no longer reproductive or viable. Treated females, e.g. of acariinae have a normal oviposition, the rate of hatching of larvae from these eggs is either nil or greatly reduced.

Tests with larvae of *Aedes aegypti* (mosquitoes)

The active substance is pre-dissolved in a little acetone and then the solution is made up to 150 cc. with tap water that had been left standing. This solution is poured into 1 liter glass beakers and 20 freshly hatched larvae of *Aedes aegypti* are added to each beaker. Crumbled dog biscuits in water serve as food. The length of the test is 12 days. A daily check is made to observe the behavior of the living larvae and to determine the number of dead larvae. To determine the number of hatched mosquitoes, the beaker was covered with a copper wire screen. In the following Table I, the number of dead larvae after 12 days with various concentrations of the active substances is listed in percent.

TABLE I

| Compounds | Percent of killed animals at a concentration of— | | |
|---|---|---|---|
| | 0.05% | 0.01% | 0.005% |
| 1-phenyl-3-methyl-3-hydroxy-triazene | 100 | 100 | 100 |
| 1-(2'-methyl-5'-chloro-phenyl)-3-isopropyl-3-hydroxy-triazene | 100 | 100 | 75 |
| 1-(2'-methyl-5'-chloro-phenyl)-3-hydroxy-3-methyl-triazene | 100 | 40 | |
| 1-(4'-chloro-phenyl)-3-hydroxy-3-ethyl-triazene | 100 | 100 | 100 |
| 1-(3',4'-dichloro-phenyl)-3-ethyl-3-hydroxy-triazene | 100 | 100 | 100 |
| 1-(4'-chlorophenyl)-3-methyl-3-hydroxy-triazene | 100 | | |
| 1-(4'-chlorophenyl)-3-isopropyl-3-hydroxy-triazene | 100 | | |
| 1-(2',4'-dichlorophenyl)-3-isopropyl-3-hydroxy-triazene | 100 | 50 | |
| 1-(2'-methyl-4'-chlorophenyl)-3-methyl-3-hydroxy-triazene | 100 | 25 | |
| 1-(2',4'-dichlorophenyl)-3-hydroxy-3-methyl-triazene | 100 | 100 | 95 |
| 1-(3',4'-dichlorophenyl)-3-hydroxy-3-methyl-triazene | 100 | 100 | |
| 1-(2'-methyl-4'-chlorophenyl)-3-hydroxy-3-isopropyl-triazene | 100 | 80 | |
| 1-(4'-propargyloxy-phenyl)-3-hydroxy-3-methyl-triazene | 100 | 30 | |
| 1-(4'-propargyloxy-phenyl)-3-hydroxy-3-isopropyl-triazene | 100 | 90 | |
| 1-(4'-acetylamino-phenyl)-3,3-dimethyl-triazene (U.S. Patent 3,162,571) | 0 | 0 | 0 |

Test with *Musca domestica* (house flies)

An acetone solution of the active substance is mixed with 50 g. of substrate for fly maggot (bran, alfa grass mixture, 10% yeast suspension). After the acetone has completely evaporated, 25 freshly hatched fly maggots are placed on this substrate. The animals are kept at 25° C. and 65% relative humidity. 12 days after the beginning of the test, the hatched flies are counted. In the following Table II, the mortality of the larvae is given in percent.

TABLE II

| Compound | Percent of killed larvae [1] |
|---|---|
| 1-phenyl-3-methyl-3-hydroxy-triazene | 78 |
| 1 - (2' - methyl-5'-chloro-phenyl)-3-hydroxy-3-methyl-triazene | 98 |
| 1-(4' - chloro-phenyl) - 3 - hydroxy-3-ethyl-triazene | 100 |
| 1 - (3',4' - dichloro-phenyl)-3-ethyl-3-hydroxy-triazene | 14 |
| 1-(4' - chlorophenyl)-3-methyl-3-hydroxy-triazene | 70 |
| 1 - (4' - chlorophenyl)-3-isopropyl-3-hydroxy-triazene | 100 |
| 1 - (2' - methyl-4'-chlorophenyl)-3-methyl-3-hydroxy-triazene | 64 |
| 1-(2',4' - dichloro-phenyl)-3-hydroxy-3-methyl-triazene | 52 |
| 1 - (3',4' - dichlorophenyl)-3-hydroxy-3-methyl-triazene | 80 |
| 1 - (2' - methyl-4'-chloro-phenyl)-3-hydroxy-3-isopropyl-triazene | 74 |
| 1 - (4' - propargyloxy-phenyl) - 3 - hydroxy-3-methyl-triazene | 92 |
| 1 - (4' - propargyloxy-phenyl)-3-hydroxy-3-isopropyl-triazene | 86 |

[1] At a concentration of 0.05%.

Action on ticks (*Boophilus microplus*) and developmental stages thereof

For the following test 10 mature adult female ticks, each of various strains (Table III, column 1), were immersed for 3 minutes in an aqueous emulsion of 1-(4'-chlorophenyl)-3-hydroxy-3-ethyl-triazene. The composition of the emulsion is indicated in the examples for the application forms given below. The ticks are then kept at 27° C. and 80% relative humidity. Oviposition was determined on the 5th, 10th and 15th day, the oviposition of a control test serving as basis for comparison. The eggs are kept under the same conditions for 20 days longer. Then the hatching rate, compared with that of the control, was determined.

TABLE III

| Boophilus tick strains | Concentration of active substance | Oviposition | Hatching rate in percent |
|---|---|---|---|
| Yeerongpilly | 0.05 | Normal | 0 |
| Hanrahan | 0.05 | do | 0 |
| Las Guerisas I | 0.05 | do | 0 |
| Biarra | 0.05 | do | 0 |
| Control | Untreated | do | 100 |

Tests with larvae of *Leptinotarsa decemlineata*
(Colorado potato beetles)

Potato plants 20 cm. high are treated with a 0.025% solution of active substance (water:acetone=1:1) and, after the sprayed coating has dried, 20 larvae in the third molting-stage are placed thereon. The larvae are transferred daily to potato plants freshly treated in the same manner, the number of dead animals being determined simultaneously.

The pupae are then isolated from the substrate for larvae by flushing them out, and then they are spread out on damp filter paper in a fly cage to determine the hatching rate. This evaluation takes place 12 days after the beginning of the test at a time when the adults have emerged from more than 50% of the pupae of the control test.

In the following table, the number of the pupae obtained, the adults which emerged therefrom, and the mortality in percent, relative to the control, are given.

TABLE V

| Starting material | n-Pupae | n-Flies 12 days after start of test | Mortality in percent of ns contro flie- |
|---|---|---|---|
| 1-(4'-chlorophenyl)-3-hydroxy-3-ethyl-triazene | 36 | 3 | 99.7 |
| Control | 1,520 | 850 | |

Action on arachnids (a) Ovicidal effect on eggs of the red spider mite (*Tetranychus urticae*): To test the ovicidal action, bean leaves infested with spider mite eggs are treated with aqueous emulsions of the active substances to be tested. The emulsions are produced from a 10% emulsifiable concentrate (see examples of application forms).

The eggs of spider mites which are resistant to phosphorous esters were used for the tests. In the following table the concentration of active substance and the hatching rate after 7 days in percent are given. The hatching rate of the control test was 100%.

TABLE VI

| Active substance | Concentration in percent | Hatching rate in percent after 7 days |
|---|---|---|
| 1-(4'-chlorophenyl)-3-hydroxy-3-ethyl-triazene | 0.1 | 0 |
| | 0.05 | 5 |

TABLE IV

| Compound | Number of dead larvae after (days)— | | | | | | | | | | | | Total |
|---|---|---|---|---|---|---|---|---|---|---|---|---|---|
| | 2 | 3 | 4 | 5 | 6 | 7 | 8 | 9 | 10 | 11 | 12 | 13 | |
| 1-(4'-chlorophenyl)-3-hydroxy-3-ethyl-triazene | 0 | 0 | 0 | 0 | 0 | 1 | 3 | 4 | 1 | 4 | 4 | 2 | 19 |
| 1-(4'-chlorophenyl)-3, 3-dimethyl-triazene [Collection Czech. Chem. commun. 30 No. 11, 3956–61 (1965)] | 0 | 0 | 0 | 0 | 0 | 0 | 0 | 0 | 0 | 0 | 0 | 0 | 0 |

Tests with various developmental stages of
*Musca domestica* (house flies)

1 kg. of fermented substrate for larvae, consisting of bran, ground alfa grass and yeast, is mixed with 50 ml. of a 1.5% solution of active substance and, after the acetone has evaporated, placed in a large breeding cage. Fly feed, consisting of sugar, powdered milk and powdered egg, is also placed in this cage. Then 25 4-day old male and 25 4-day old female flies are placed in the cage and 20 1-day old, 20 2-day old, and 20 3-day old fly maggots are added to the substrate for larvae. The flies lay the eggs in the substrate for larvae. The breeding is carried out for 4 days at 30° C.; under these conditions and during this time, the freshly laid eggs develop to the pupal-stage, and the transformation into the pupal-stage the larvae which have been added occurs correspondingly earlier.

(b) Effect on the developmental cycle of spider mites (*Tetranychus urticae*): Bean leaves, each containing 10 female spider mites (A) and 10 deutonymphs (B), are sprayed with an aqueous emulsion of the active substance, obtained from a 10% emulsifiable concentrate (see examples of the application forms). To determine the number of eggs laid each day from A and B, starting on the third day after the beginning of the test, the animals were placed on fresh bean leaves which had been treated with the same emulsion. The eggs were counted daily and kept on the leaves at 24° C. and 50 to 60% relative humidity. After 8 days the hatching rate was determined.

In Table VII, firstly the concentration of active substance is listed, secondly the number of eggs laid per day and per animal from the treated females (A) and the females which emerged from the treated deutonymphs (B), and thirdly the hatching rate from these eggs in percent.

TABLE VII

| Active substance | Concentration | Number of eggs laid per day and per female | | Hatching rate in percent | |
|---|---|---|---|---|---|
| | | A | B | A | B |
| 1-(4'-chlorophenyl)-3-hydroxy-3-ethyl-triazene | 0.1 | 19 | 32 | 17 | 16 |
| 1-(4'-chlorophenyl)-3-hydroxy-3-isopropyl-triazene | 0.1 | 12 | 21 | 9 | 11 |

The pesticidal compositions according to the invention are produced in known manner by intimately mixing and grinding the active substances of the general Formula I together with suitable carriers, optionally with the addition of dispersing agents or solvents, which are inert towards the active substances. The active substances can be prepared and used as dusts, scattering agents, granulates (such as coated granulates, impregnated granulates and homogeneous granulates, wettable powders, pastes, emulsifiable concentrates, solutions or aerosols.

To produce dusts, scattering agents and granulates, the active substances are mixed with solid carriers. Examples of carriers which can be employed are kaolin, talcum, bole, loess, chalk, limestone, ground limestone, Attaclay, dolomite, diatomaceous earth, precipiated silicic acid, alkaline earth silicates, sodium and potassium aluminium silicates (feldspar and mica), calcium and magnesium sulfates, magnesium oxide, ground synthetic plastics, fertilizers such as ammonium phosphates, ammonium nitrate, urea, ground vegetable products such as bran, bark, dust, sawdust, ground nutshells, cellulose powder, residues of plant extractions, active charcoal, etc. These carriers can be used alone or admixed with each other.

The particle size of the carriers is, for dusts advantageously up to about 0.1 mm., for scattering agents from about 0.075 to 0.2 mm., and for granulates 0.2 mm. or coarser.

The concentrations of active substance in the solid preparations are usually from 0.5 to 80%.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyll phenols having 5 to 15 ethylene oxide radicals per molecule and 8 to 9 carbon atoms in the alkyl radical, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substances and anti-foam agents and, optionally, solvents. The concentration of active substance in these agents is 5 to 80%.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are so mixed, ground, sieved and strained with the additives mentioned above that, in wettable powders, the solid particle size is of from 0.02 to 0.04 mm. and in pastes the size of 0.03 mm. is not exceeded. To produce emulsifiable concentrates and pastes, dispersing agents such as those given in the previous paragraphs, organic solvents and water are used. Examples of suitable solvents are the following: alcohols, benzene, xylenes, toluene, dimethyl sulfoxide, and mineral oil fractions boiling between 120 and 350° C. The solvents must be practically odorless, not phytotoxic, inert to the active substances and not readily inflammable.

Furthermore, the compositions according to the invention can be applied in the form of solutions. For this purpose the active substance or several active substances of general Formula I are dissolved in suitable organic solvents, mixtures of solvents or in water. Aliphatic and aromatic hydrocarbons, chlorinated derivatives thereof, alkyl naphthalenes and mineral oils alone or mixed with each other can be used as organic solvents. The solution should contain the active substances in a concentration of from 1 to 20%.

The compositions described according to the invention can be mixed with other biocidally active compounds or agents. Thus, to broaden the range of action, the new agents can contain, e.g. insecticides, fungicides, bactericides, fungistatics, bacteriostatics or nematocides in addition to the compounds mentioned of the general Formula I. The compositions according to the invention can also contain plant fertilizers, trace elements, etc.

The following application forms of the compositions according to the invention serve to illustrate the present invention; where not otherwise expressly stated, "parts" means parts by weight.

Dust

The following substances are used for the preparation of (a) a 10% and (b) a 5% dust:

(a)

| | Parts |
|---|---|
| 1-(4'-chlorophenyl)-3-hydroxy-3-ethyl-triazene | 10 |
| Highly dispersed silicic acid | 5 |
| Talcum | 85 |

(b)

| | Parts |
|---|---|
| 1-phenyl-3-hydroxy-3-methyl-triazene | 5 |
| Spindle oil | 1.2 |
| Calcium carbonate | 40 |
| Talcum | 53.8 |

The active substances are mixed and ground with the carriers. The resulting dusts are employed, for example, for the control of cockroaches and ants, etc. in buildings, but also for the protection of plants.

Wettable powder

The following components are used for the preparation of (a) and (b) 50%, (c) 25% and (d) 10% wettable powders:

(a)

| | Parts |
|---|---|
| 1-(4'-chlorophenyl)-3-hydroxy-3-ethyltriazene | 50 |
| Naphthalene sulfonic acid/benzene sulfonic acid/formaldehyde condensate | 5 |
| Sodium dibutyl naphthyl sulfonate | 5 |
| Champagne chalk | 5 |
| Silicic acid | 20 |
| Kaolin | 15 |

(b)

| | Parts |
|---|---|
| 1-(2'-methyl-5'-chlorophenyl)-3-hydroxy-3-isopropyl-triazene | 50 |
| Sodium dibutyl naphthyl sulfonate | 5 |
| Calcium lignin sulfonate | 10 |
| Champagne chalk/hydroxyethyl cellulose mixture (1:1) | 1 |
| Silicic acid | 20 |
| Kaolin | 14 |

(c)

| | Parts |
|---|---|
| 1-(2'-methyl-5'-chlorophenyl)-3-hydroxy-3-methyl-triazene | 25 |
| Lignin sulfonic acid-calcium salt | 5 |
| Sodium dibutyl naphthyl sulfonate | 2 |
| Kaolin | 68 |

(d)

| | Parts |
|---|---|
| 1-(4'-chlorophenyl)-3-hydroxy-3-ethyl-triazene | 10 |
| Mixture of sodium salts of saturated fatty alcohol sulfates | 3 |
| Naphthalene sulfonic acid/formaldehyde condensate | 5 |
| Kaolin | 82 |

The active substances are intimately mixed with the additives in suitable mixers and ground on mills and rollers. Wettable powders are obtained which can be diluted with water to form suspensions of any desired concentration. Such suspensions are employed primarily to control biting and sucking insects in plant protection.

Paste

The following substances are used to prepare a 40% paste:

| | Parts |
|---|---|
| 1-(4'-chlorophenyl)-3-hydroxy-3-ethyl-triazene | 40 |
| Lignin sulfonic acid-calcium salt | 5 |
| Ethylene glycol | 10 |
| Carboxymethyl cellulose | 0.5 |
| Water | 44.5 |

The active substance is intimately mixed and ground in suitable equipment. A paste is obtained which can be diluted with water to form suspensions of any desired concentration. These suspensions are suited for the control of insects in plant protection.

Emulsifiable concentrate

For the production of 10% emulsifiable concentrates:

(a)

| | Parts |
|---|---|
| 1-(4'-chlorophenyl)-3-hydroxy-3-ethyl-triazene | 10 |
| Xylene | 55 |
| Dimethyl formamide | 32 |
| Composite emulsifier (alkylaryl-polyethylene glycol/alkylaryl sulfonate-calcium salt) | 3 | or

(b)

| | Parts |
|---|---|
| 1-(3',4'-dichlorophenyl)-3-ethyl-3-hydroxy-triazene | 10 |
| Methylcellosolve-polyethylene glycol | 54 |
| Mixture of aromatic hydrocarbons having a boiling range of 180 to 220° | 30 |
| Composite emulsifier (alkylaryl-polyethylene glycol/alkylaryl sulfonate-calcium salt) | 6 | are mixed together. These concentrates can be diluted with water to concentrations suitable for the protection of plants and stored goods.

Spray

For the production of (a) a 2% and (b) a 5% spray:

(a)

| | Parts |
|---|---|
| 1-(4'-chlorophenyl)-3-methyl-3-hydroxy-triazene | 2 |
| Xylene | 10 |
| Petroleum | 88 |

(b)

| | Parts |
|---|---|
| 1-(4'-chlorophenyl)-3-isopropyl-3-hydroxy-triazene | 5 |
| Ethylcellosolve | 95 | are mixed together. The solutions are sprayed with a pressure sprayer and serve especially for the control of flies and mosquitoes in living quarters, warehouses and slaughter houses.

What is claimed is:

1. A method for controlling insects which comprises applying thereto an insecticidally effective amount of a 3-hydroxy-triazene selected from the group consisting of 1-phenyl-3-methyl-3-hydroxy-triazine, 1-(2' - methyl - 5'-chloro-phenyl)-3-isopropyl-3-hydroxy - triazene, 1 - (2'-methyl-5'-chloro-phenyl)-3-hydroxy-3-methyl-triazene, 1-(4'-chloro-phenyl)-3-hydroxy-3-ethyl-triazene, 1-(3',4'-dichloro-phenyl)-3-ethyl-3-hydroxy-triazene, 1-(4' - chloro-phenyl)-3-methyl-3-hydroxy - triazene, 1-(4' - chloro-phenyl)-3-isopropyl-3-hydroxy-triazene, 1-(2',4'-dichloro-phenyl)-3-isopropyl-3-hydroxy-triazene, 1-(2'-methyl - 4'-chlorophenyl)-3-methyl-3-hydroxy-triazene, 1-(2',4' - di-chlorophenyl)-3-hydroxy-3-methyl-triazene, 1-(3',4' - di-chlorophenyl)-3-hydroxy-3-methyl-triazene, 1-(2'-methyl-4'-chlorophenyl)-3-hydroxy-3-isopropyl-triazene, 1 - (4'-propargyloxy-phenyl)-3-hydroxy-3-methyl-triazene and 1-(4'-propargyloxy-phenyl)-3-hydroxy-3-isopropyl-triazene.

2. Method according to claim 1 wherein said 3-hydroxy-triazene is applied in the form of a mixture with an inert dispersible carrier vehicle, said 3-hydroxy-triazene being present in an amount of from 0.01 to 80% by weight of the total mixture.

3. Method according to claim 1, wherein said 3-hydroxy-triazene is 1-(4'-chlorophenyl)-3-ethyl-3-hydroxy-triazene.

4. Method according to claim 1, wherein said 3-hydroxy-triazene is 1-(4'-chlorophenyl)-3-isopropyl-3 - hydroxy-triazene.

5. A method according to claim 2 in which the carrier vehicle is a finely divided dispersible solid.

6. Method according to claim 5, wherein said 3-hydroxy-triazene is 1-(4'-chlorophenyl)-3-ethyl-3-hydroxy-triazene.

7. Method according to claim 5, wherein said 3-hydroxy-triazene is 1-(4'-chlorophenyl)-3-isopropyl-3 - hydroxy-triazene.

8. A method according to claim 2 in which the carrier vehicle is an inert dispersible liquid.

9. Method according to claim 8, wherein said 3-hydroxy-triazene is 1-(4'-chlorophenyl)-3-ethyl-3-hydroxy-triazene.

10. Method according to claim 8, wherein said 3-hydroxy-triazene is 1-(4'-chlorophenyl)-3-isopropyl-3 - hydroxy-triazene.

11. Method according to claim 2, wherein said 3-hydroxy-triazene is 1-(4'-chlorophenyl)-3-ethyl-3-hydroxy-triazene.

12. Method according to claim 2, wherein said 3-hydroxy-triazene is 1-(4'-chlorophenyl)-3-isopropyl-3-hydroxy-triazene.

References Cited

UNITED STATES PATENTS 3,162,571  12/1964  Adams et al. _____ 424—226

OTHER REFERENCES

Sogani et al., Jour. Indian Chem. Soc., vol. 36, No. 8 (1959), pp. 563–66.

Elkins et al., J. Chem. Soc. (1938), pp. 1346–1347.

STANLEY J. FRIEDMAN, Primary Examiner

V. D. TURNER, Assistant Examiner

U.S. Cl. X.R.

424—DIG 12